United States Patent [19]
Carey et al.

[11] Patent Number: 5,056,078
[45] Date of Patent: Oct. 8, 1991

[54] LOAD MECHANISM FOR A BEAM ADDRESSABLE INFORMATION STORAGE DISK DRIVE SYSTEM

[75] Inventors: James R. Carey; David L. Rowden, both of Rochester, N.Y.; Patrick J. Champagne, Cupertino, Calif.

[73] Assignee: Literal Corporation, Colorado Springs, Colo.

[21] Appl. No.: 287,805

[22] Filed: Dec. 20, 1988

[51] Int. Cl.$^5$ .............................................. G11B 33/02
[52] U.S. Cl. ................................. 369/77.2; 369/75.2; 369/77.1
[58] Field of Search ............... 360/135, 110, 104, 101; 369/77.2, 75.1, 77.1, 270, 263; 206/404

[56] References Cited
U.S. PATENT DOCUMENTS

| | | | |
|---|---|---|---|
| 4,177,491 | 12/1979 | Jahn | 360/135 |
| 4,482,993 | 11/1984 | Agostini | 369/263 |
| 4,577,307 | 3/1986 | Woods et al. | 369/270 |
| 4,707,819 | 11/1987 | Ehara | 369/77.2 |
| 4,723,185 | 2/1988 | Maeda | 369/77.2 |
| 4,730,296 | 3/1988 | Urata et al. | 369/75.2 |
| 4,759,008 | 7/1988 | Hirano et al. | 369/75.2 |
| 4,773,058 | 9/1988 | Petruchik et al. | 369/77.2 |
| 4,785,365 | 11/1988 | Ohkita | 369/77.2 |
| 4,866,693 | 6/1989 | Odawara et al. | 369/75.2 |
| 4,890,276 | 12/1989 | Ono et al. | 369/77.2 |

FOREIGN PATENT DOCUMENTS 2075741 11/1981 United Kingdom .

Primary Examiner—David Trafton
Assistant Examiner—Richard M. Weinberg
Attorney, Agent, or Firm—Kinney & Lange, P.A.

[57] ABSTRACT

A disk drive spindle and spindle motor assembly is mounted on a support platform which is translated reciprocally toward and away from a stationary disk cartridge by a pair of rotationally driven cranks positioned along opposite sides of the platform. The cranks are coupled to the platform by eccentrically mounted support rods loosely captured in the span between dual sets of parallel, compliant leaf springs attached to side edges of the platform. The rotational cranks are provided with a degree of overtravel to forcefully urge the platform, when in the operational position, against precision stops formed on the underside of a mount plate located between the platform and disk cartridge. The spatial relationship of a disk engaging surface on the drive spindle relative to the precision stops is such as to precisely position the rotating disk in parallel with the tracking axis of the read/write head of the system. A pair of holes in the platform mate in sliding relationship with a pair of locator pins depending from the mount plate to maintain correct x-y positioning of the platform during its reciprocal translation.

8 Claims, 6 Drawing Sheets

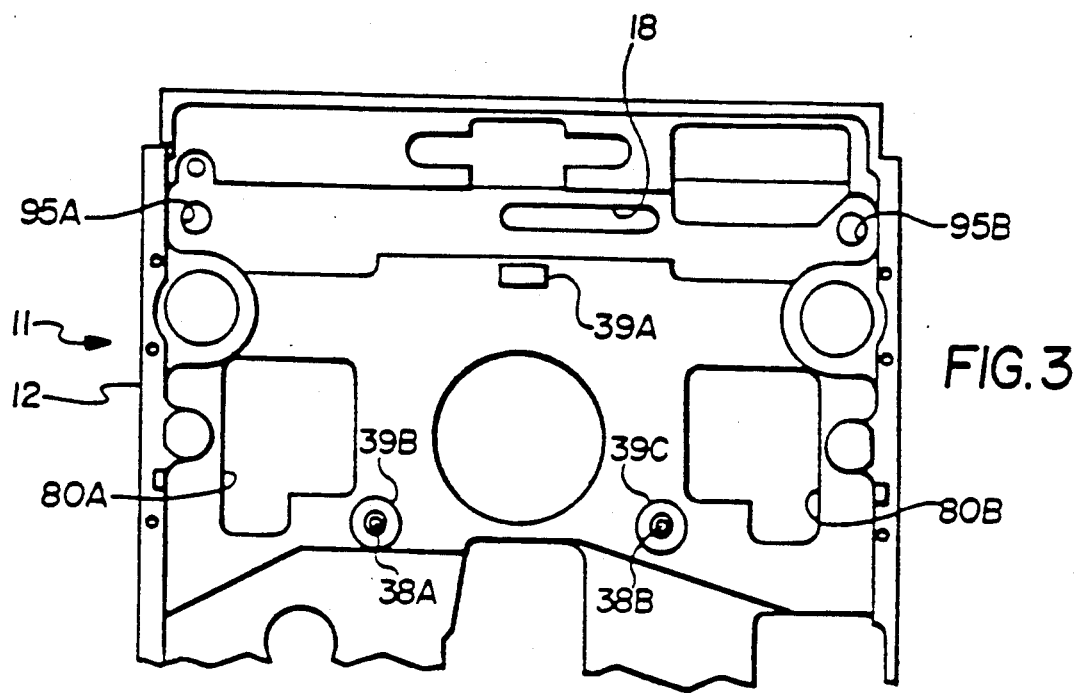
FIG.3
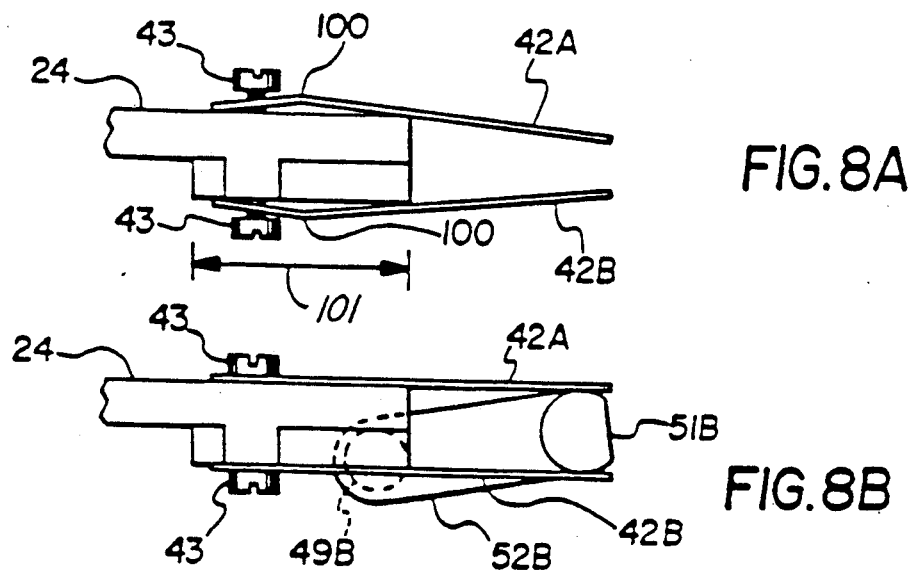
FIG.8A
FIG.8B

LOAD MECHANISM FOR A BEAM ADDRESSABLE INFORMATION STORAGE DISK DRIVE SYSTEM

CROSS-REFERENCE TO RELATED APPLICATIONS

Reference is made to the following U.S. patent applications, all filed concurrently herewith:

Ser. No. 07/287,806, entitled DISK CARTRIDGE POSITIONING MECHANISM FOR AN INFORMATION STORAGE DISK DRIVE SYSTEM by James R. Carey, James D. Harney and Ronald A. Crain;

Ser. No. 07/287,803, entitled TWO-STAGE LINEAR DRIVE APPARATUS FOR AN INFORMATION STORAGE DISK DRIVE SYSTEM by James R. Carey and Patrick J. Champagne;

Ser. No. 07/287,802, entitled INFORMATION STORAGE DISK LOADING APPARATUS WITH DRIVE GEAR OVERLOAD PROTECTION by James R. Carey.

FIELD OF THE INVENTION

This invention relates to the field of optical beam addressable disk drive systems and more particularly to apparatus for positioning a spindle drive motor in engagement with the data disk after it has been inserted into the system.

BACKGROUND OF THE INVENTION

There is a need for compactly structured beam addressable information storage disk drive systems capable of fitting within the half height format of a personal computer drive bay. The problem of achieving this objective is aggravated somewhat by the fact that beam addressable storage disks are rigid plastic disks many times the thickness of flexible ("floppy") disks commonly used as removable storage media for personal computers. Moreover, such disks are generally encased in protective hard shelled cartridges that add to the bulk of the disk assembly that must be accommodated in the drive system.

It is well known to provide disk drive load mechanisms for removable disks that guide the inserted disk downward into engagement with the drive spindle used to rotate the disk during write/read operation. A drawback of this approach is that a relatively large volume of space, both vertically and laterally, must be reserved for the vertical up and down movement of the disk cartridge. This is a particular problem with a beam addressable system since it would require that the height of the optical head be reduced to accommodate the downward moving cartridge. Additionally, peripheral space occupied by the vertically moving cartridge could be used more efficiently to accommodate other components of the drive system.

As a consequence, it is preferable to provide a load mechanism that accepts insertion of the disk in a single plane and moves the drive spindle axially of the disk to drivingly engage the disk hub, without any axial motion of the disk.

U.S. Pat. No. 4,177,491 illustrates one form of a mechanism in which a combined centering cone and drive chuck are moved axially to engage the center of a computer disk. In this mechanism, the cone/chuck mechanism is moved into position on the disk hub along a lead screw formed on the outer surface of a drive spindle stationary by a friction device. The holding force of the friction device is overcome when the chuck engages the disk so that the spindle screw and chuck rotate together to drive the disk. The driving force is provided by an external motor drive engaging the outer circumference of the spindle housing. In the disclosure of this patent, the disk is vertically oriented and the axial movement is horizontal, although the mechanism could just as easily be rotated 90° resulting in vertical translation of the drive chuck.

U.S. Pat. No. 4,482,993 is another example of a mechanism used to move the drive spindle to the disk hub except that, in this case, the drive spindle is raised vertically to engage a horizontal disk. In this disclosure, the spindle and spindle drive motor, assembled together inside a cylindrical enclosure, are translated axially within the cylinder to the disk by an external rotating cam member acting on a follower pin attached to the spindle drive motor housing.

These mechanisms, although accomplishing the objective of engaging the drive spindle to the disk without moving the disk out of its insertion plane, have the problem that they are bulky in design and occupy more space than would be desirable for use in a half height disk drive configuration. Moreover, since they are designed for use with magnetic disks, the operative positioning of the spindle is not of critical concern and no particular provision for this is made in the disclosed mechanisms. In fact, the camming arrangement for the magnetic disk drive of U.S. Pat. No. 4,482,993 would inherently be unable to provide the precise vertical positioning of the spindle which is important in a magneto-optical disk drive. Also, the mechanism of U.S. Pat. No. 4,177,491, with its reliance on frictional clutching/declutching surfaces, may not be suited for practical application where power consumption, wear and heat are critical concerns.

It is important that the disk-engaging surface of an axially translatable drive spindle be precisely positioned during read/write operation along the "z" axis dimension, without any tilt or skewing, since this is critical to the proper focusing of the optical read/write beam on the data surface of the disk. Magnetic disk drives employ read/write heads that are either directly in contact the disk recording surface or ride on air and thus are not subject to this critical requirement.

It is therefore an object of the present invention to provide a load mechanism for a beam addressable information storage disk drive system which overcomes the disadvantages of known disk drive systems of the type described above.

It is another object of the invention to provide a load mechanism for a system of the type described which is compact in design and suitable for use in half height computer drive bay configurations.

It is yet another object of the invention to provide a load mechanism for a system of the type described that orients the disk relative to the read/write optical beam with a high degree of precision so as to minimize the amount of beam focus error correction attributable to disk positioning.

SUMMARY OF THE INVENTION

Therefore, in accordance with the invention, there is provided a load mechanism for a beam addressable information storage disk drive system which comprises means for receiving and holding a cartridge with an optical or magneto-optical disk therein having a central drive hub; and disk drive means, including a disk drive spindle and spindle drive motor, adapted to be translated to the cartridge for engaging the disk central hub and for rotationally driving the disk. The load mechanism further comprises translation means disposed on opposite sides of the disk drive means for imparting reciprocal motion of said disk drive means toward and away from the disk; and compliant spring means engaged between the disk drive means and the translation means for compliantly conveying the reciprocal movement from the translation means to the disk drive means.

In a preferred form of the invention, the disk drive spindle and spindle drive motor are mounted on a planar platform. At least two pairs of relatively stiff compliant leaf springs are mounted symmetrically with respect to the axial center of the drive spindle at opposite sides of the platform. The springs in each pair of springs are mounted in parallel facing relationship extending outwardly from the platform to form an elongated span therebetween. The translation means includes a pair of counter-rotatable cranks on each side of the platform with each crank having eccentrically mounted support arm loosely captured within the span of the leaf springs. The load mechanism further comprises a plurality of precision stops cooperating with the surface of the platform when in the disk engaging position to precisely position the disk during read write operation. With this arrangement, any overtravel of the translation means beyond that required to properly position the disk drive means at either end of the translation motion is absorbed by the compliant spring means. Moreover, the positive force of the springs is effectively used to assure that correct positioning of the disk is achieved and maintained throughout the read/write operation.

BRIEF DESCRIPTION OF THE DRAWINGS

In the drawings:

FIG. 3 is a bottom plan view of a portion of the base mount plate to which is mounted the spindle lift load mechanism of FIG. 2.

FIGS. 8(a) and 8(b) are partial side views of a portion of the mechanism of FIG. 2 illustrating details of the spindle lift platform support leaf springs.

DETAILED DESCRIPTION

Figure 1:
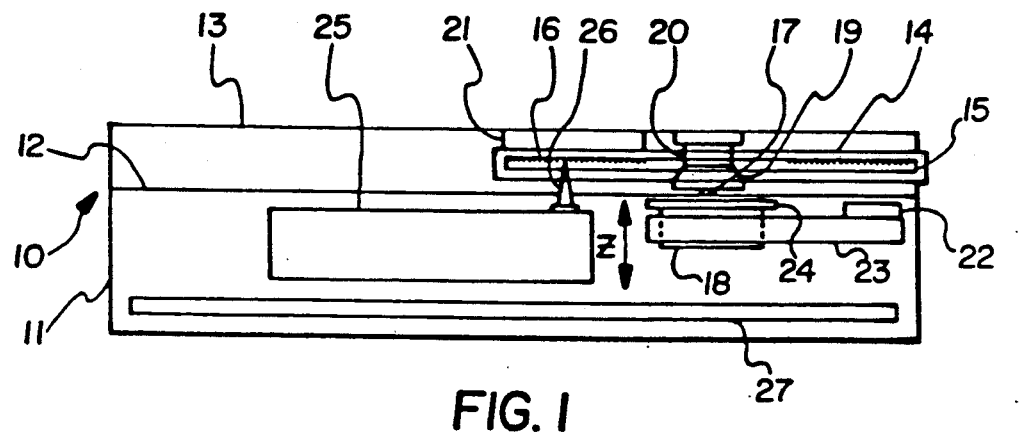
FIG. 1 is a side elevation view showing in schematic form a disk drive system embodying the load mechanism of the invention.

Referring to FIG. 1, a schematic side view of an information storage disk drive system 10 of the invention includes a base enclosure 11 having an base mount plate 12 which forms a mounting base for the components of the system 10. An upper enclosure 13 includes provision for receiving and holding a disk cartridge 14 having nested therein a magneto-optical information storage disk 15. Closely spaced data tracks 16 are formed in concentric grooves on the upper planar surface of disk 15 by deposition of a recording medium comprising a thin layer of suitable thermo-magneto-optical material utilizing processes well known for this purpose. As an alternative to concentric grooves, data tracks 16 may be "pseudo grooves" comprised of a single elongated track formed in a spiral with its center coincident with the center of disk 15. A drive spindle 17 is drivingly connected, at its lower end, to spindle drive motor 18 and, at its upper end, to a disk engaging chuck and centering cone assembly 19 which cooperates with a disk clamp 20 positioned above disk 15 to engage and rotationally drive the disk during read/write operation of the system 10. An electromagnetic bias coil 21 is held in place on upper housing 13 above disk 15 and is supplied with current from a source, not shown, to generate a concentrated magnetic field which is applied to the recording medium of the data tracks 16 as part of the magneto-optical read/write process. Spindle motor 18 is mounted on a platform 24 which, in accordance with the invention, is supported on a load drive mechanism mount plate 23 by means of a lift apparatus to be described in more detail subsequently. Load drive apparatus 22 is also housed on mount plate 23 and operates, among other things, to provide driving force to actuate the lift apparatus.

A read/write head 25 is translatably suspended from mount plate 12 inside base enclosure 11 by means of tracking actuator apparatus which moves the head laterally (right and left as viewed in the drawing) along a drive path which is parallel to the planar surface of disk 15 and generally radial to the disk center to position and hold a focussed laser optical beam 26 generated within head 25 on a selected one of data tracks 16. Suitable tracking actuator apparatus for this purpose is disclosed in copending application Ser. No. 07/287,801, filed Dec. 20, 1988, entitled SINGLE STAGE TRACKING ACTUATOR APPARATUS FOR OPTICAL BEAM INFORMATION STORAGE DRIVE SYSTEM and the details are not repeated here as they are not required for an understanding of the present invention. A printed circuit board 27 may be positioned along the bottom of base enclosure 11 to provide necessary control functions for operation of the disk drive system.

As is well known, it is important that the spatial orientation of disk 15 be set and maintained, both statically and rotationally, as precisely as possible in relation to the position of the beam objective lens in head 25 in order to minimize the amount of focus and tracking error correction required to be applied to the objective lens focus actuator and head tracking actuator to compensate for any such mispositioning. Ideally therefore, at the time disk 15 is clamped onto the disk engaging surface of spindle drive assembly 19, the axial ("z" axis) distance between the objective lens in head 25 and the plane of data tracks 16 should be set at the focal length of the objective lens in order to avoid static misfocussing. Additionally, the plane of rotation of the disk must be held precisely parallel with the line of travel (tracking axis) of head 25 since any tilt of disk 15 will result in dynamic misfocussing as the head traverses across the tracks putting further stress on the objective lens focus actuator in the head. As a consequence, the function of the spindle drive in positioning the disk is an important element in the successful operation of the disk drive. While it is relatively easy to accomplish this at the point of manufacture in the case of a stationary spindle drive mounted directly to the mechanism mounting, a disk drive with a movably mounted spindle drive requires careful consideration to achieve this result on a repetitive basis, each and every time a disk is inserted into the drive.

Figure 2:
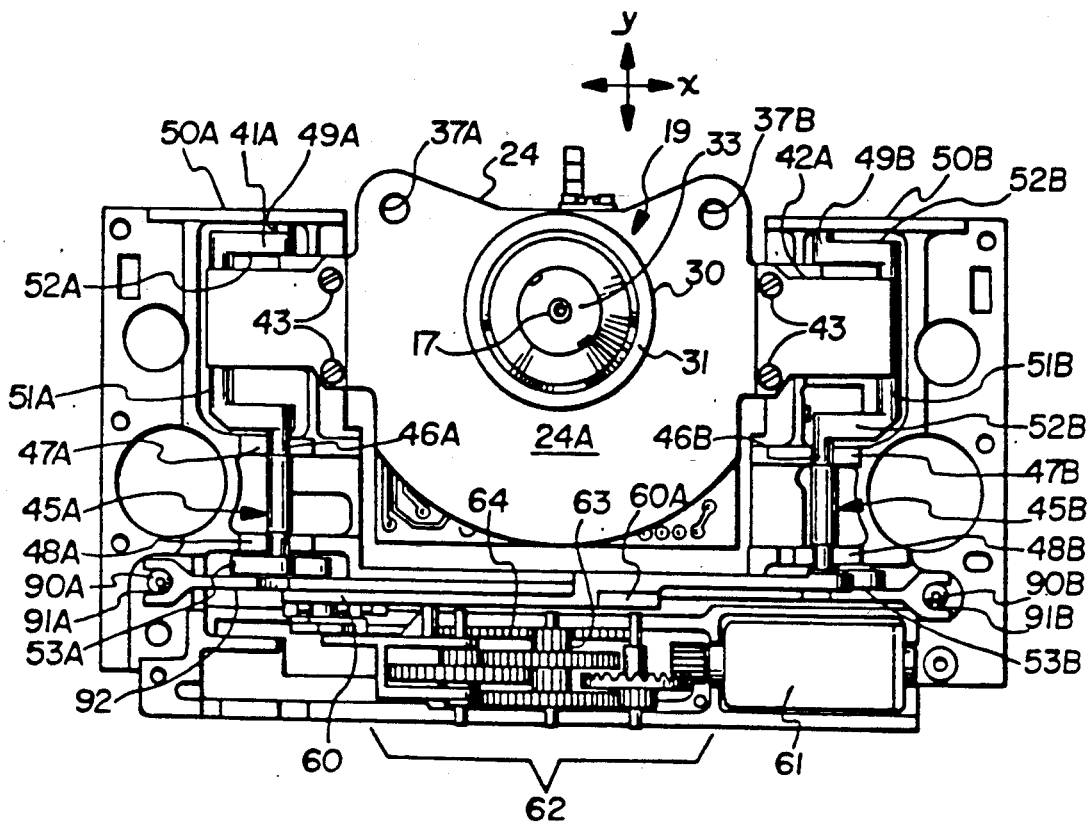
FIG. 2 is a top plan view of that portion of the disk drive embodying a spindle lift load mechanism constructed in accordance with the invention.
Figure 4:
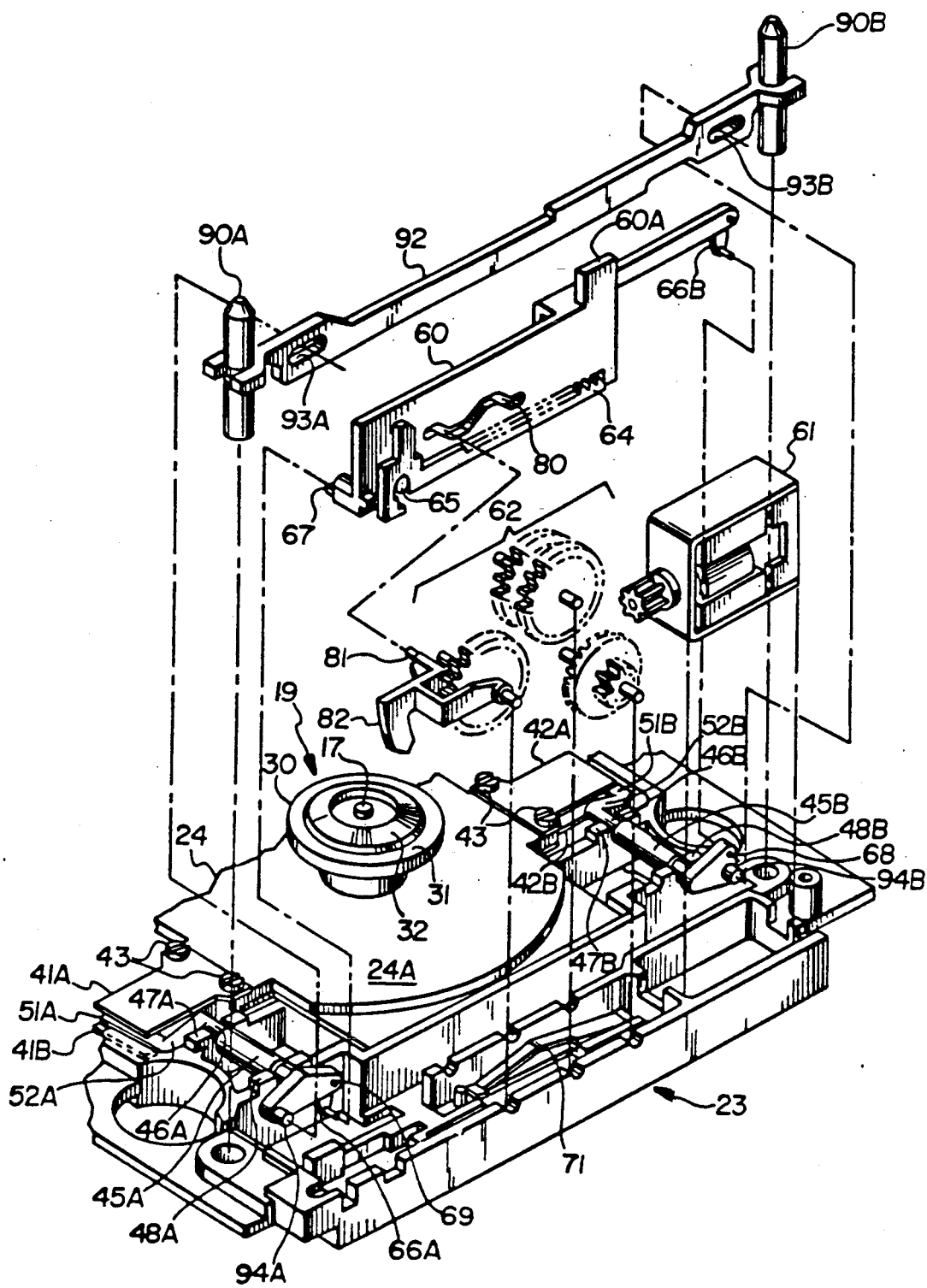
FIG. 4 is a front perspective view, partially exploded, of the mechanism of FIG. 2.

Referring now jointly to FIGS. 2-4, the load mechanism of the invention includes disk drive spindle assembly 19 having a spindle 17 on which is fixed a spindle chuck 30 having a disk engaging surface 31. A disk centering cone 32 is mounted on spindle 17 concentrically within the disk engaging surface of the chuck and is held in place by a washer shaped steel disk 33 press fit onto spindle 17. A spindle drive motor 18 is drivingly engaged with spindle 17. The entire assembly of drive motor, centering cone and chuck is precision mounted on a horizontally disposed platform 24 held loosely in place by side mounted parallel leaf springs 41a, 41b and 42a, 42b (FIG. 6(a)) coupled to eccentrically mounted support arms on rotational cranks 45a and 45b, to be described in greater detail subsequently. A pair of positioning holes 37a, 37b are formed in platform 24 and are adapted to slidably engage with a mating pair of positioning pins 38a, 38b which depend from the bottom surface of mount plate 12 (FIG. 6(a)). The diameters of pins 38a, 38b and holes 37a, 37b are selected to provide a close but non-binding fit to allow sliding axial movement of platform 24 up and down pins 38a, 38b without appreciable lateral movement of platform 24. At the time that spindle assembly 19 is mounted on platform 24, the assembly and the positioning holes are precisely oriented relative to each other in the lateral or "x-y" direction so that the mating of holes 37a, 37b on positioning pins 38a, 38b assures the correct "x-y" orientation of chuck 30 with the central aperture of disk 15 when the two are brought into engagement by the lifting of platform 24 into its operational position (FIG. 6(b)).

A trio of precision stops 39a-39c are formed in a triangular configuration on the undersurface of mount plate 12 to accurately position the upper surface of platform 24 when the platform is raised to bring disk engaging surface of chuck 30 into engagement with disk 15. Precision machining of the land areas of the stops relative to the surfaces of similar mount pads used for the tracking actuator of head 25 and precision mounting of spindle assembly 19 on platform 24 are employed to assure that a correct vertical (z-axis) spacing of disk tracks 16 from the objective lens of head 25 is achieved, as well as a disk rotational plane that is parallel to the tracking axis of head 25, each time the platform is raised into its operational position.

The mechanism for raising and lowering platform 24 includes compliant spring means, comprised of a first pair of flat, relatively stiff leaf springs 41a, 41b and a second, similar pair of leaf springs 42a, 42b, mounted on opposite sides of platform 24 by suitable means such as screws 43. The pairs of leaf springs are preferably mounted symmetrically on a line passing through the axial center of spindle 17. The springs of each pair are mounted on upper and lower surfaces of platform 24 and extend respectively outwardly from the platform to form a space or span therebetween as can best be seen in FIG. 8(b).

Translation means for translating the platform 24 toward disk 15 includes a pair of counter-rotatable cranks 45a, 45b disposed on opposite sides of platform 24. The cranks have their rotational axles 46a, 46b journalled in slots in upstanding walls 47a, 47b and 48a, 48b formed on the load mechanism support plate 23. For additional support, crank axle ends 49a, 49b are journalled in holes in walls 50a, 50b also formed on mount plate 23. Support arms 51a, 51b mounted eccentrically on the cranks by crank arms 52a, 52b are loosely captured in the spans between respective pairs of leaf springs 41a, 41b and 42a, 42b and provide the sole means of axial support for platform 24.

Referring briefly to FIGS. 8(a) and 8(b), there is illustrated the mounting of right-hand leaf springs 42a, 42b on platform 24, the left-hand leaf springs 41a, 41b being similarly mounted. Thus leaf springs 42a, 42b are preferably formed with a slight bend 100 near the mounting screws as shown in FIG. 8(a) to provide a pre-load force to assure that, while the support arms are loosely captured by the springs, the fit is snug enough that there is no excess play in the mounting. To assure that the springs are parallel when screws 43 are tightened, platform 24 is extended outward by a short length 101 to hold the springs parallel against the pre-load force.

Means for rotationally driving cranks 45a, 45b includes a reversible load drive motor 61 connected to a speed reducing gear train 62 having its final pinion gear 63 engaging the teeth of rack drive gear 64. Rack gear 64 is drivingly engaged to a linear load drive lever 60 by means of a drive pin 65 extending from load drive lever 60 into a mating notch at the end of rack gear 64. An elongated leaf spring 71 is located beneath rack 64 serving, in part, to urge the rack teeth into firm engagement with pinion gear 63. Load drive motor 61 operates through the gear drive just described to drive linear load drive lever 60 laterally in the left or right direction (as viewed in FIG. 2) depending on whether disk cartridge 14 is being loaded into or unloaded from disk drive system 10. A serpentine cam slot 80 in load drive lever 60 engages with a follower pin 81 on a flag 82 and operates to lower and raise the flag into and out of the path of an optical switch (not shown) mounted on circuit board 27 which is used to turn the drive motor 61 off at each end of the lateral travel of load drive lever 60.

Figure 7A:
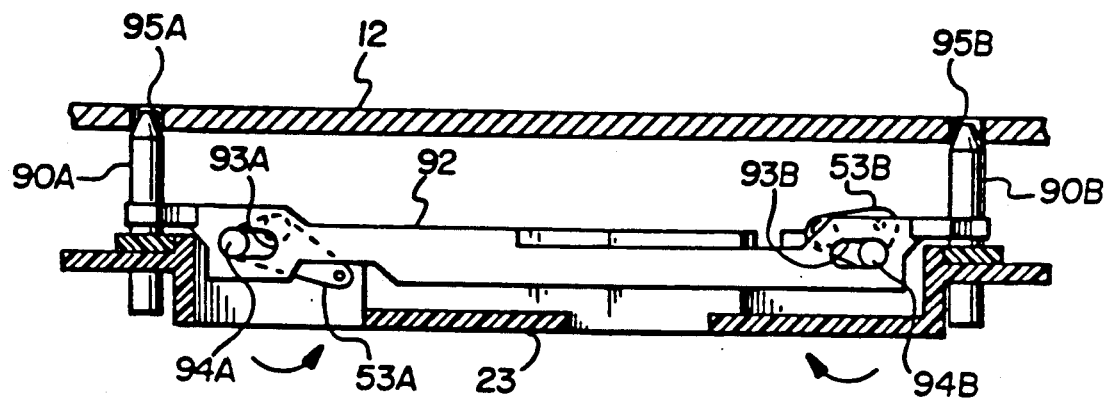
FIGS. 7(a) and 7(b) are simplified front elevation views of the cartridge locator pin lift portion of the load mechanism of FIG. 2.
Figure 7B:
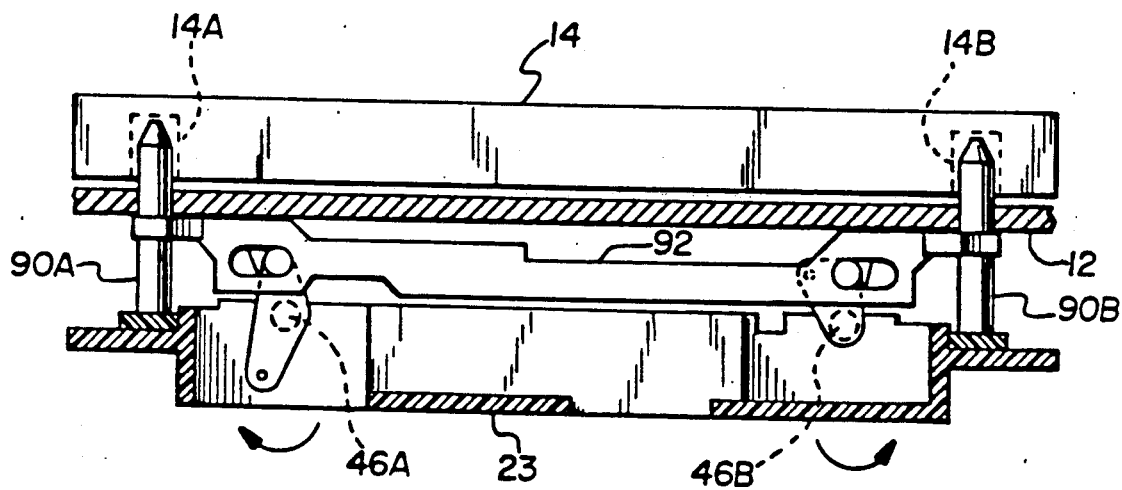

Means for laterally positioning disk cartridge 14 in upper housing 13 after the cartridge has been inserted includes a pair of cartridge positioning pins 90a and 90b having chamfered upper ends adapted to engage corresponding positioning notches 14a, 14b formed in the undersurface of the cartridge 14 (FIG. 7(b)) at the outer rear corners thereof. Pins 90a, b are journalled in slots 91a, and 91b at opposite ends of lift lever 92. Cam slots 93a and 93b are formed in lever 92 near the outer ends thereof to engage drive pins 94a and 94b mounted eccentrically on arms 53a and 53b of the rotational drive cranks. A pair of precision holes 95a, 95b are formed in mount plate 12 to receive positioning pins 90a, 90b for vertical translation into engagement with the notches on the cartridge.

Figure 5A:
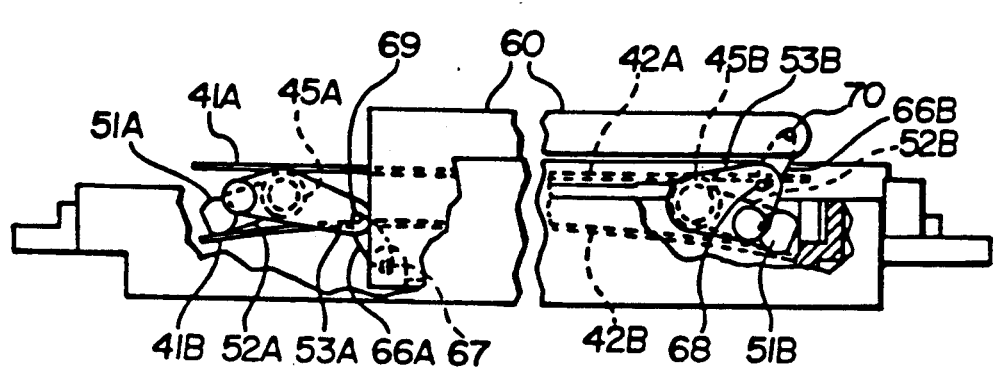
FIGS. 5(a)-5(c) are simplified front elevation views illustrating the load drive portion of the load mechanism of FIG. 2.
Figure 5B:
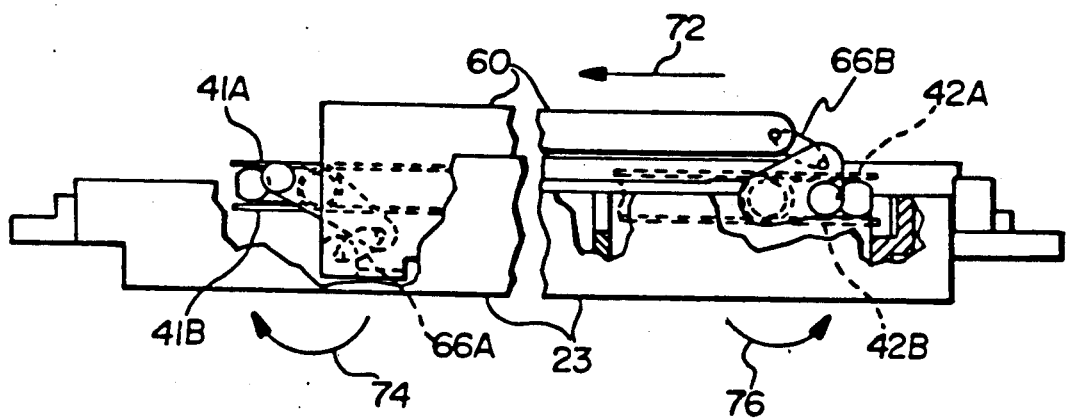
Figure 5C:
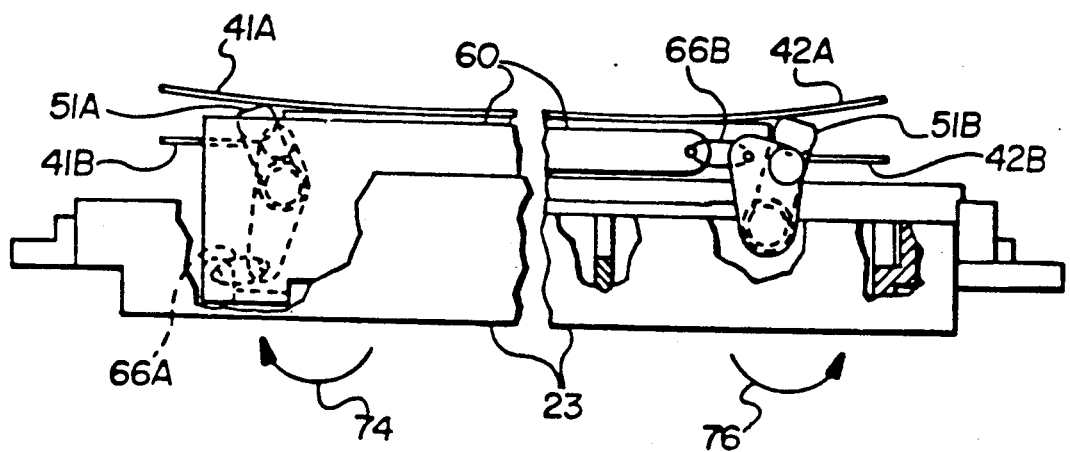
Figure 6A:
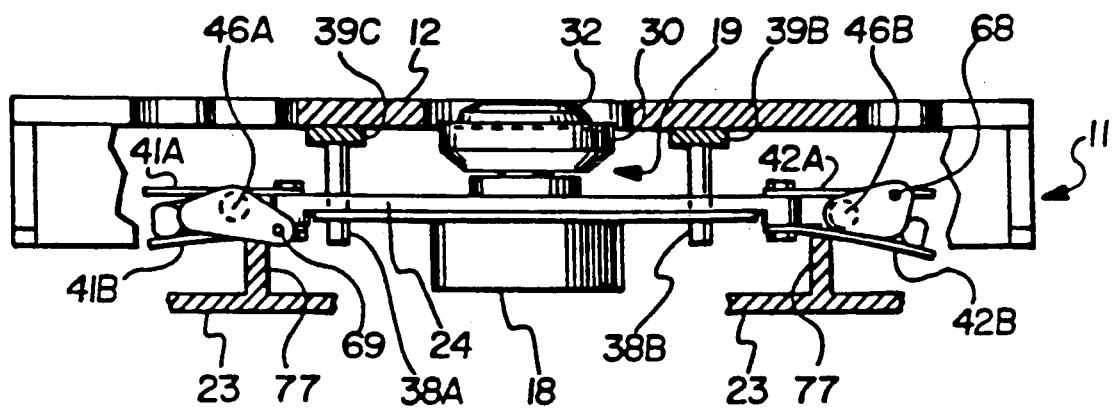
FIGS. 6(a) and 6(b) are simplified front elevation views of the drive spindle lift portion of the load mechanism of FIG. 2.

Turning now to FIGS. 5(a)-5(c), the manner in which load drive lever 60 operates to rotate cranks 45a, 45b will now be explained. As shown in these figures, load drive lever 60 is connected to drive crank arms 53a, 53b by means of pivotable links 66a and 66b, respectively. Link 66a is connected from hole 69 in drive crank arm 53a to hole 67 in load drive lever 60 at a level below that of crank axle 46a while link 66b is connected from hole 68 in drive crank arm 53b to hole 70 in load drive lever 60 at a level above that of crank axle 46b. When load drive lever 60 is in the full right position (FIG. 5(a)), which is the case when there is no disk cartridge loaded in the drive, pins 66a and 66b are positioned slightly overcenter to the right of their respective drive crank arms 53a and 53b. This corresponds to the downmost position of spindle drive platform 24 resting on the lower stops 77 formed on mount plate 23 as shown in FIG. 6(a). When a disk cartridge is manually inserted into upper housing 13 and just before it reaches its final position, the cartridge engages a switch (not shown) which activates drive motor 61 to complete the final loading of the cartridge under power. When motor 61 is activated, it operates through gear train 62 and rack 64 to force load drive lever 60 to the left in the direction of arrow 72 in FIG. 5(b). During the initial leftward motion of load drive lever 60 from the position in FIG. 5(a) to that in FIG. 5(b), cartridge positioning apparatus (not shown) in upper housing 13 is driven by the drive tab 60a extending upward from load drive lever 60 through slot 80 in mount plate 11 (FIG. 3) to cause cartridge 14 to be set under power into its final position in the housing ready for engagement of the disk by spindle drive chuck 30. During this initial drive period, links 66a and 66b pivot over center of crank arm drive holes 67 and 68, respectively, providing an idle period during which platform 24 remains stationary on lower stops 77 while cartridge 14 is being powered into its final position.

Once cartridge 14 is fully seated, the continued leftward motion of load drive lever 60 puts links 66a, 66b in tension with their respective arms and results in counter-rotation of cranks 45a and 45b, as indicated by arrows 74 and 76, thus raising platform support arms 51a, 51b. As the support arms are rotated upwards, they also slide inward in the spans between the pairs of parallel leaf springs 41a, 41b and 42a, 42b. This action continues until load drive lever reaches its leftmost position as shown in FIG. 5(c) at which time a flag 82 is operative in conjunction with the optical switch on circuit board 27 to deactivate load drive motor 61.

Figure 6B:
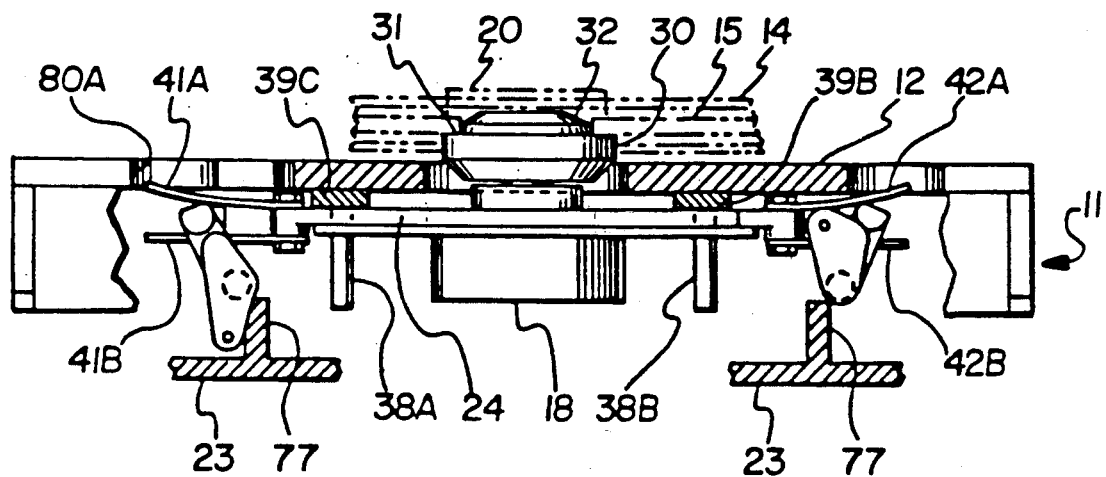

Referring now to FIG. 6(a), platform 24 is shown in its lowermost position on lower stops 77. In this position, platform support arms 51a and 51b on the rotational cranks are rotated slightly below horizontal, bending lower leaf springs 41b and 42b thus exerting a positive force holding platform 24 firmly against stops 77. In FIG. 6(b), platform 24 is shown in its uppermost position with spindle chuck in engagement with disk 15. In this position, the cranks are rotated slightly above horizontal to urge the platform with a positive force against the precision stops 39a-39c thereby providing a firm support for platform 24 resistant to vibration and also assuring proper operational positioning of the spindle chuck 30, and consequently the disk 15, relative to head 25. Apertures 80a and 80b are formed in mount plate 12 to provide relief to allow springs 41a and 42a to flex upwards without interference with mount plate 12. The use of the compliant spring mounts of the invention permits the use of less costly, relatively low tolerance parts in the driving means by not requiring close tolerance precision parts to achieve and hold the desired spatial positioning of spindle chuck 30.

FIGS. 7(a)-(b) illustrate the manner in which the pair of vertically oriented positioning pins 90a, 90b are lifted through precision locator holes 95a, 95b into upper housing 13 to provide proper lateral positioning of cartridge 14. Accordingly, as rotational cranks 53a and 53b are rotated to raise platform 24, cam drive pins 94a, 94b rise and slide in cam slots 93a, 93b to cause lever 92 to be raised conjointly with the raising of platform 24. If there is any residual mispositioning of the cartridge at the end of its powered loading phase, the chamfered ends of locator pins 90a, 90b will cause the cartridge to move laterally until properly positioned as the pins slide into the notches 14a, 14b of the cartridge. Preferably the timing is such that locator pins 90a, 90b reach cartridge 14 first so the cartridge positioning is completed by the time spindle assembly reaches disk 15. In this way, the disk is assured of being correctly positioned to accept the centering cone 32 on spindle chuck 30 as the cone enters the disk access aperture of the cartridge.

The invention has been described in detail with particular reference to a presently preferred embodiment, but it will be understood that variations and modifications can be effected within the spirit and scope of the invention.

What is claimed is:

1. Load mechanism for a beam addressable information storage disk drive system comprising:
   means for receiving and holding a cartridge with a beam addressable storage disk therein, said disk having a drive engaging surface;
   disk drive means, including a disk centering drive spindle and spindle drive motor, adapted to be translated to said cartridge for engaging said disk drive engaging surface and for rotationally driving said disk;
   translation means disposed on opposite sides of said disk drive means for providing reciprocal driving motion in a direction toward and away from said disk; and
   at least two pairs of relatively stiff, compliant leaf springs extending between said disk drive means and said translation means for compliantly conveying said reciprocal drive motion from the translation means to the disk drive means;
   whereby any overtravel of the translation means beyond that required to properly position the disk drive means at either end of its translation motion is absorbed by the compliant leaf springs.

2. Load mechanism of claim 1 further comprising a mount plate for the load mechanism positioned between the disk cartridge receiving means and the disk drive means and a plurality of precision stops formed on the surface of the mount plate facing the disk drive means for determining an operational position of the disk drive means.

3. Load mechanism of claim 2 wherein said translation means is adapted to have a degree of overtravel at least in the direction of translation movement of the disk drive means toward the disk to urge the disk drive means with a positive force against said precision stops to assure proper operational positioning of the disk drive means.

4. Load mechanism for a beam addressable information storage disk drive system comprising:
   means for receiving and holding in its own plane a cartridge with a beam addressable storage disk therein having a central drive engaging surface;
   a support platform below said cartridge receiving means having a planar reference surface and being translatable reciprocally between an upper operational position in parallel with the plane of the disk and a lower non-operational position;

disk drive means including a disk centering drive spindle and spindle drive motor mounted on said platform, said drive spindle having a chuck with a disk engaging surface spaced a fixed predetermined distance from the reference plane of said platform for engaging and rotationally driving said disk when the platform is in its operational position;

at least two pairs of relatively stiff, compliant leaf springs, fixedly attached at diametrically opposed sides of said platform, each pair of springs being cantilevered laterally outward from the sides of the platform in facing parallel relationship to form an open span therebetween;

lift means including a rotational crank individually associated with each pair of leaf springs, each crank having a platform support rod-like member loosely captured in the span between its associated pair of leaf springs, said member being mounted eccentrically of the rotational axis of the crank by means of one or more lever arms;

and crank drive means for rotating said cranks to cause reciprocal translation motion of said support platform and disk drive means.

5. Load mechanism of claim 4 further comprising a mount plate for the load mechanism positioned between the disk cartridge receiving means and the disk drive means and having precision stop means formed on the surface of the mount plate facing the disk drive means for determining the operational position of the disk drive means.

6. Load mechanism of claim 5 wherein said cranks and crank drive means are adapted to provide a degree of overtravel at least when said platform is in its operational position thereby to urge the platform with a positive force against said precision stops to assure proper operational positioning of the disk drive means.

7. Load mechanism of claim 5 further comprising a plurality of locator pins depending from said mount plate, said platform having a corresponding plurality of holes mating in sliding relationship with said locator pins whereby a predetermined lateral orientation of said platform is maintained during reciprocal translation of said platform.

8. Load mechanism of claims 5 or 7 wherein said cartridge includes a plurality of positioning reference notches; and wherein said mechanism further includes a plurality of cartridge positioning pins adapted to engage said notches, and includes lift lever means connected to said crank drive means for lifting said positioning pins into engagement with said cartridge notches conjointly with the lifting of said support platform into its operational position.

* * * * *